(12) United States Patent
Mecca et al.

(10) Patent No.: US 12,717,405 B2
(45) Date of Patent: Aug. 25, 2026

(54) TECHNIQUES FOR DISPLAYING IMAGES IN A VISUAL EFFECTS SYSTEM

(71) Applicant: Universal City Studios LLC, Universal City, CA (US)

(72) Inventors: Anthony Alexander Mecca, Winter Garden, FL (US); Evie Czerniawska, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/657,433

(22) Filed: May 7, 2024

(65) Prior Publication Data

US 2025/0218124 A1 Jul. 3, 2025

Related U.S. Application Data

(60) Provisional application No. 63/616,965, filed on Jan. 2, 2024.

(51) Int. Cl.
*G06T 19/00* (2011.01)
*A63J 5/02* (2006.01)
(Continued)

(52) U.S. Cl.
CPC .............. *G06T 19/00* (2013.01); *G06F 3/013* (2013.01); *G06T 15/005* (2013.01);
(Continued)

(58) Field of Classification Search
CPC ... G06T 19/00; G06T 15/005; G06T 2210/62; G06T 15/00; G06F 3/013; G06F 3/011; G06F 3/1423; G09F 19/02; G09F 19/125; G09F 19/14; G09F 19/18; G09F 19/12; G09F 27/005; G09G 2300/023; G09G 2354/00; G09G 2356/00; G09G 2360/04;
(Continued)

(56) References Cited

U.S. PATENT DOCUMENTS 6,377,229 B1 4/2002 Sullivan
8,646,917 B2 2/2014 Reichow et al.
(Continued)

FOREIGN PATENT DOCUMENTS

JP 2004214764 A 7/2004

OTHER PUBLICATIONS

PCT/U.S. Pat. No. 2024062315 International Search Report and Written Opinion mailed Mar. 7, 2025.

*Primary Examiner* — Douglas Wilson
(74) *Attorney, Agent, or Firm* — Fletcher Yoder, P.C.

(57) ABSTRACT

A visual effects system includes a first display, a second display, and a graphics generation system. The graphics generation system is configured to provide graphics data to the first display and the second display to define a combined image. The graphics generation system includes a processing system and a memory, the memory encoded with instructions configured to be executed by the processing system to cause the first display and the second display to display a first image on the first display based on the graphics data and a user location, a user gaze orientation, or both, and display a second image on the second display based on the graphics data and the user location, the user gaze orientation, or both.

19 Claims, 3 Drawing Sheets

(51) Int. Cl.

| | |
|---|---|
| ***G02B 27/01*** | (2006.01) |
| ***G02B 30/52*** | (2020.01) |
| ***G06F 3/01*** | (2006.01) |
| ***G06F 3/14*** | (2006.01) |
| ***G06T 15/00*** | (2011.01) |
| ***G09F 19/02*** | (2006.01) |
| ***G09F 19/12*** | (2006.01) |
| ***G09F 19/14*** | (2006.01) |
| ***G09F 19/18*** | (2006.01) |
| ***G09G 3/00*** | (2006.01) |
| ***H04N 13/363*** | (2018.01) |
| ***H04N 13/383*** | (2018.01) |
| ***H04N 13/395*** | (2018.01) |
| ***H04N 13/398*** | (2018.01) |
| *A63G 31/00* | (2006.01) |
| *G02B 27/00* | (2006.01) |
| *G09F 27/00* | (2006.01) |
| *H04N 13/388* | (2018.01) |

(52) U.S. Cl.

CPC .......... *A63F 2250/02* (2013.01); *A63G 31/00* (2013.01); *A63J 5/02* (2013.01); *A63J 5/023* (2013.01); *G02B 27/0093* (2013.01); *G02B 2027/0187* (2013.01); *G02B 30/52* (2020.01); *G06F 3/011* (2013.01); *G06F 3/1423* (2013.01); *G06T 15/00* (2013.01); *G06T 2210/62* (2013.01); *G09F 19/02* (2013.01); *G09F 19/12* (2013.01); *G09F 19/125* (2021.05); *G09F 19/14* (2013.01); *G09F 19/18* (2013.01); *G09F 27/005* (2013.01); *G09G 3/003* (2013.01); *G09G 3/004* (2013.01); *G09G 2300/023* (2013.01); *G09G 2354/00* (2013.01); *G09G 2356/00* (2013.01); *G09G 2360/04* (2013.01); *H04N 13/363* (2018.05); *H04N 13/383* (2018.05); *H04N 13/388* (2018.05); *H04N 13/395* (2018.05); *H04N 13/398* (2018.05)

(58) Field of Classification Search

CPC ...... G09G 3/003; G09G 3/004; H04N 13/363; H04N 13/383; H04N 13/395; H04N 13/388; H04N 13/398; A63J 5/02; A63J 5/023; G02B 27/0093; G02B 30/52; G02B 2027/0187; A63F 2250/02; A63G 31/00

See application file for complete search history.

(56) References Cited

U.S. PATENT DOCUMENTS

| | | | | |
|---|---|---|---|---|
| 8,692,738 | B2 * | 4/2014 | Smithwick | G02B 30/27 345/6 |
| 8,947,382 | B2 * | 2/2015 | Winkler | G06F 3/017 345/173 |
| 2013/0222270 | A1 * | 8/2013 | Winkler | H04M 1/72448 345/1.3 |
| 2014/0118336 | A1 | 5/2014 | Smithwick | |
| 2015/0130836 | A1 * | 5/2015 | Anderson | G06F 21/31 345/633 |
| 2017/0310956 | A1 * | 10/2017 | Perdices-Gonzalez | G09G 3/2092 |
| 2018/0322818 | A1 * | 11/2018 | O'Brien | G06T 15/005 |
| 2022/0244566 | A1 | 8/2022 | Fuerst et al. | |
| 2025/0097589 | A1 * | 3/2025 | Ho | H04N 23/741 |

* cited by examiner

TECHNIQUES FOR DISPLAYING IMAGES IN A VISUAL EFFECTS SYSTEM

CROSS-REFERENCE TO RELATED APPLICATION

This application claims priority from and the benefit of U.S. Provisional Application Ser. No. 63/616,965, entitled "TECHNIQUES FOR DISPLAYING IMAGES IN A VISUAL EFFECTS SYSTEM", filed Jan. 2, 2024, which is hereby incorporated by reference in its entirety.

BACKGROUND

A venue, such as an amusement park, may include a variety of attractions and themed areas. Some attractions and themed areas may include displays (e.g., monitors, digital screens, volumetric displays, and/or other displays) to provide images for visualization by guests in the attractions and/or to facilitate navigating through the themed areas. With increasing sophistication and complexity of modern ride attractions and modern themed areas, it is presently recognized that it may be desirable to provide improved systems to create such visual effects.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a visual effects system includes a first display, a second display, and a graphics generation system. The graphics generation system is configured to provide graphics data to the first display and the second display to define a combined image. The graphics generation system includes a processing system and a memory, the memory encoded with instructions configured to be executed by the processing system to cause the first display and the second display to display a first image on the first display based on the graphics data and a user location, a user gaze orientation, or both, and display a second image on the second display based on the graphics data and the user location, the user gaze orientation, or both.

In one embodiment, a method for operating a visual effects system includes displaying, via a processing system, a first image on a first display based on graphics data, and adjusting, via the processing system, the first image on the first display based on a viewer location, a viewer gaze orientation, or both. The method also includes displaying, via the processing system, a second image on a second display based on the graphics data, and adjusting, via the processing system, display of the second image on the second display based on the viewer location, the viewer gaze orientation, or both such that the first image and the second image coordinate to define a combined image representative of a virtual object.

In one embodiment, a visual effects system includes a first display, a second display, and a graphics generation system. The graphics generation system is configured to provide graphics data to the first display and the second display. The graphics generation system includes a processing system and a memory, the memory encoded with instructions configured to be executed by the processing system to cause the first display and the second display to display a first image on the first display based on the graphics data, and actuate to adjust the first image on the first display based on the graphics data and one or more viewer locations, one or more viewer gaze orientations, or both. The instructions are also configured to be executed by the processing system to cause the first display and the second display to actuate to adjust the second image on the second display based on the graphics data and the one or more viewer locations, the one or more viewer gaze orientations, or both such that the first image and the second image define a combined image.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
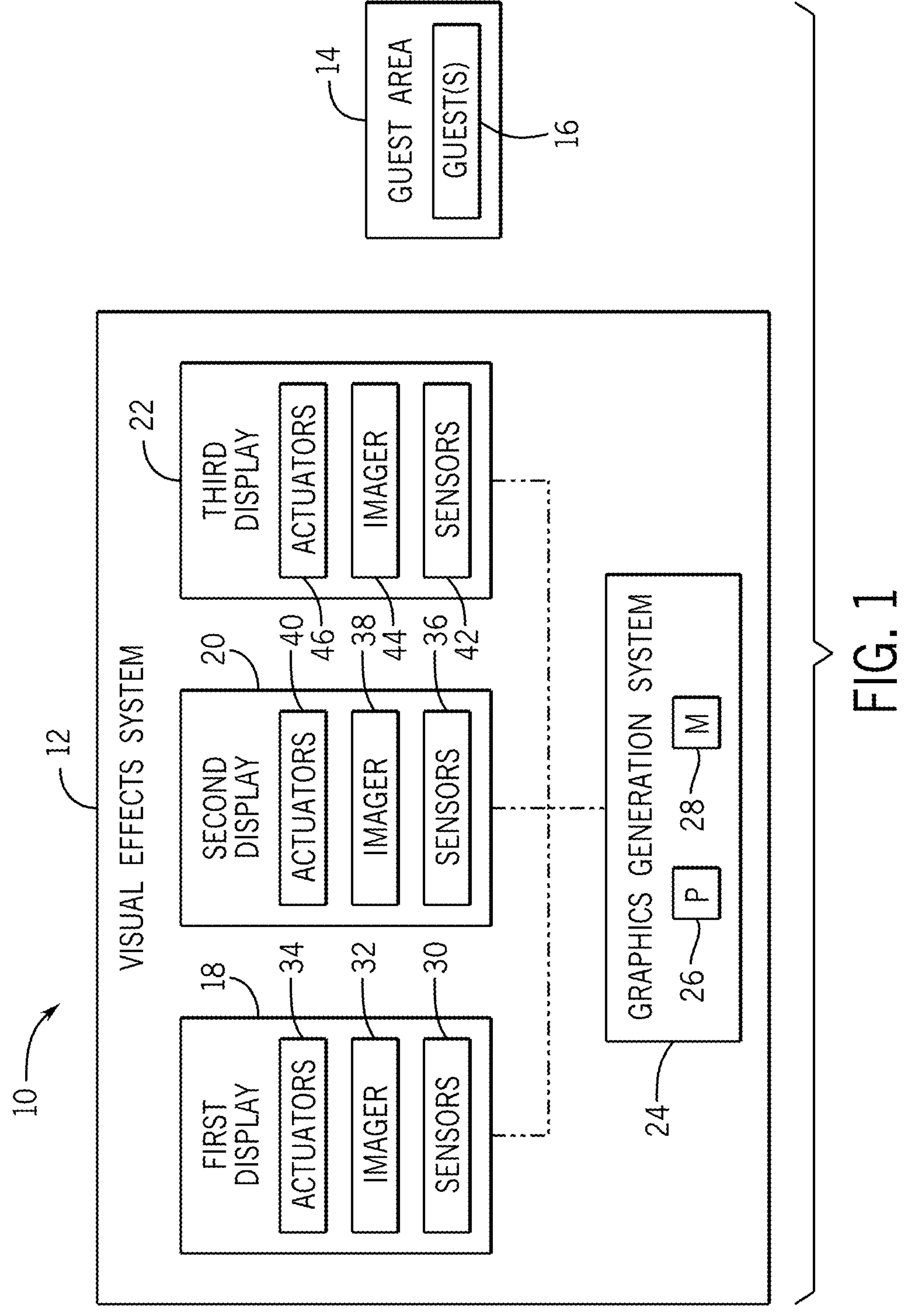
FIG. 1 is a schematic diagram of an environment that includes a visual effects system, in accordance with an embodiment of the present disclosure.

The present disclosure generally relates to a visual effects system that provides visual effects via multiple displays.

One or more or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Attractions and areas (e.g., themed areas) within amusement parks may include displays (e.g., monitors, digital screens, volumetric displays, and/or other displays) to provide images for visualization by guests in the attractions and/or to facilitate navigating through the areas, which may include one or more attractions and/or themed areas. Thus, it is presently recognized that it is desirable to provide improved systems to create visual effects for such purposes.

The present disclosure is directed to a visual effects system that provides visual effects (e.g., image effects). The visual effects system may utilize multiple displays (e.g., transparent and/or translucent displays) to provide a variety of visual effects. For example, the layered visual effects system may include a first display, a second display, and a third display positioned at particular orientations (e.g., parallel to each other). The first display, the second display, and/or the third display may receive graphics data (e.g., image data) from a graphics generation system (e.g., a game engine, a simulation engine). Further, the first display, the second display, and/or the third display may each simultaneously or at separate times display images based on the graphics data. The images on the first display, the second display, and/or the third display may be displayed in a manner that creates an illusion of a smooth transition or movement of a virtual object shown in the images from one display to another when the displays are viewed in alignment such that the displays are essentially layered along a path of observation (e.g., a viewer is observing one or more of the displays via another of the displays). It should be noted that use of mathematical terms in describing present embodiments should not be interpreted in a rigid mathematical context. For example, reference to displays being positioned parallel to each other should not be interpreted as exactly parallel in a mathematical sense. Rather, the term should be interpreted as substantially parallel within tolerances that should be understood in the art to achieve the desired relationship and/or effect. For example, the displays are positioned in a parallel manner so that they are viewable as layers.

The graphics generation system may provide the graphics data to enable a rendering of the images on the first display, the second display, and/or the third display. Indeed, the graphics data may include data related to shapes, positions, colors, intensity, lighting, and/or transparency (e.g., brightness) of the images. Thus, the graphics generation system may enable facilitation of the smooth transition of the images from one display to another to create the visual effects for the guests in the amusement park. Smooth transition of the images from one display to another corresponds to transitioning an image through a space that separates the displays by presenting image aspects on each of the displays in a manner that creates the illusion of the presented image at least partially residing in the space separating the displays.

As an example, a guest may be positioned in front of the first display, the second display, and/or the third display, wherein the first display is furthest from the guest, the third display is closest to the guest, and the second display is between the first and third displays. An image may be displayed on the first display with a first size (e.g., a smaller size) and a first level of transparency (e.g., opaque, 0% transparent). For example, the image may include an image of a virtual object. This may make the image appear to reside at the same location as the first display. To make the virtual object appear as though the virtual object is moving toward the guest, the graphics generation system may transmit graphics data that causes adjustment of the image by increasing the transparency of the virtual object in the image to a second level of transparency (e.g., 60%). At the same time, the graphics data may be transmitted to the second display, causing the second display to display the virtual object with a second size (e.g., a bigger size) and a third level of transparency (e.g., partially transparent, 40%). By sharing image data between screens and adjusting transparency in accordance with present embodiments, an image can be made to seem as though it resides at least partially between the displays. Eventually, the image may fully transition to a particular one of the displays (e.g., with 100% opacity) and appear to reside at the location of the relevant display. In this manner, display of the virtual object may undergo a continuous transformation from the first display to the second display and/or similarly to the third display, to convey movement of the virtual object toward or away from the guests.

In one embodiment, the first display, the second display, and/or the third display may include one or more sensors. The one or more sensors may provide sensor data associated with a location and/or a gaze orientation of the guests relative to the first display, the second display, and/or the second display. Based on this data, the graphics generation system may instruct actuators coupled to each of the first display, the second display, and/or the third display to actuate based on the location and/or the gaze orientation of the guests. That is, the first display, the second display, and/or the third display may each be rotated or displaced either uniformly or differently relative to the guests. In one embodiment, the graphics generation system may adjust the graphics data and, thus, the display of the images on the first display, the second display, and/or the third display based on the location and/or the gaze orientation of the guests. Making such adjustments may facilitate providing visual effects that are calibrated for viewing by the guest in a preferred orientation. For example, it may be important to have alignment within a threshold offset to make sure that sufficient overlap occurs between images displayed on different screens to create an illusion of dimensionality and presence in gaps between displays for the guest.

With the foregoing in mind, FIG. 1 is a schematic diagram of an environment 10 that includes a visual effects system 12, in accordance with an embodiment of the present disclosure. The environment may be associated with an amusement park, and may include any suitable area that is being explored by an amusement park guest, such as an attraction or a themed area. The environment 10 may include a guest area 14 where one or more guests 16 (e.g., one or more viewers) may be positioned. As an example, the guest area 14 may include a path (e.g., a walkway, a queue, a line) through which the guests 16 may navigate. As another example, the guest area 14 may include a space (e.g., a seating area) where the guests 16 may be positioned to view a performance. As a further example, the guest area 14 may include a ride vehicle that may move and carry the guests 16 throughout the environment 10.

Further, the environment 10 may include the visual effects system 12 that may provide entertainment to the guests 16 located in the guest area and/or in the environment 10. For example, the visual effects system 12 may create visual effects that are viewable by the guests 16. The visual effects system 12 may include a first display 18, a second display 20, a third display 22, and/or a graphics generation system 24 (e.g., control system, controller). It should be noted that although the visual effects system 12 is described as including the first display 18, the second display 20, and/or the third display 22, any suitable plurality of displays may be employed in the visual effects system 12.

The graphics generation system 24 may be communicatively coupled (e.g., via wireless or wired communication paths) to the first display 18, the second display 20, and the third display 22. The graphics generation system 24 may include one or more processors 26 (referred to herein as a processor or processing system for convenience) and a memory 28. The processor 26 may be any type of computer processor or microprocessor capable of executing computer-executable code. The processor 26 may also include multiple processors, processing circuitry, or a processing system that may perform the operations described herein. The memory 28 may include a volatile memory, such as random-access memory (RAM), and/or a nonvolatile memory (ROM).

The memory 28 may store a variety of information and may be used for various purposes. For example, the memory 28 may store processor-executable instructions, such as instructions for controlling components of the first display 18, the second display 20, and the third display 22. The memory 28 may also include flash memory, or any suitable optical, magnetic, or solid-state storage medium, or a combination thereof. The memory 28 may store data, instructions (e.g., software or firmware for controlling display of images on the first display 18, the second display 20, and the third display 22), and any other suitable information.

The graphics generation system 24 may include any one or more suitable components that generate and transmit graphics data (e.g., image data) to the first display 18, the second display 20, and the third display 22. The graphics data may include image data associated with shapes, positions, colors, intensity, lighting, and/or transparency (e.g., opacity, brightness). In one embodiment, the image data may also be associated with virtual objects displayed in the images. For example, the graphics generation system 24 may include a dedicated game engine or computing device that dynamically generates instructions executable by processor 26 to cause the first display 18, the second display 20, and the third display 22 to display and adjust display of the images across each of the displays. The graphics generation system 24 may include a rendering engine that may facilitate rendering of two-dimensional (2D) or three-dimensional (3D) graphics.

Further, the graphics generation system 24 may include a physics engine, which enables a design and simulation of real-life activities, movements, and reactions. For example, the physics engine may provide data related to velocity, acceleration, fluidity, transparency, projectile motion, and so on, of virtual objects shown in the images. In this manner, the physics engine may provide a visual simulation of real-life action instances. Moreover, the physics engine may enable the graphics generation system 24 to determine positioning and shapes of the virtual object within a space and display the virtual object on the first display 18, the second display 20, and/or the third display 22 based on the determined positioning and shape. The physics engine of the graphics generation system 24 may facilitate modeling of a real world environment and coordination of presentation of virtual objects properly within the real world environment. For example, a head of a figure may begin being displayed on the second display 20 while the feet of the figure may be displayed on the first display 18 based on where the physics engine determines the figure should be positioned in the real world environment (as partially defined by the displays) based on modeling established by the physics engine.

In one embodiment, a user may input 3D models and use tools of the graphics generation system 24 to arrange objects (e.g., virtual objects), define lighting conditions, and configure other elements within a virtual environment or scene to manipulate the graphics data and the images displayed to the guests 16. For example, the user may input a size of the virtual object, a level of transparency (e.g., a level of brightness), and a speed at which an image transitions and adjusts at each display. Further, inputs may be provided to calibrate a virtual environment to a real world environment. For example, a virtual volume through which a character is to be depicted as moving can be correlated to a corridor defined by a series of aligned transparent and/or translucent displays that will be employed to present the character to guests.

As described herein, the images may include images of a virtual object (or multiple virtual objects). The graphics generation system 24 may aid in facilitation of visualization of a smooth transition of the virtual object in the images from the first display 18, to the second display 20, and/or to the third display 22, and vice versa. Indeed, the graphics data provided by the graphics generation system 24 may include data related to shapes, transparency (e.g., brightness), positions (e.g., locations), colors, and/or lighting of the virtual object at each of the first display 18, the second display 20, and/or the third display 22. The graphics data may enable display and adjustment of the images based on the graphics data associated with a visual representation of the virtual object to the first display 18, the second display 20, and/or the third display 22. Additional details regarding display of the images via the graphics generation system will be described below with respect to FIGS. 2-3.

The first display 18, the second display 20, and/or the third display 22 may include any suitable display (e.g., a liquid crystal display (LCD), light-emitting diode (LED) display, organic light emitting diode (OLED) display, micro-LED display, transparent LCD display, transparent OLED display) that receives image data and displays (e.g., projects, transmits) the image data as images. Any display that is not the rearmost display should include at least some level of transparency so that imagery from one or more displays behind it can be seen through it. However, even the rearmost display can be transparent/translucent. For example, the first display 18, the second display 20, and/or the third display 22 may include the transparent OLED display, which may include pixels that each (e.g., respectively) emit light such that the pixels are see through when not displaying content. In this manner, the guests 16 may see through all or at least a portion of the first display 18, the second display 20, and/or the third display 22. In one embodiment, the first display 18, the second display 20, and the third display 22 may represent a first scrim, a second scrim, and a third scrim respectively. The first scrim, the second scrim, and/or the third scrim may be utilized to implement similar images display techniques as the first display 18, the second display 20, and the third display 22. Likewise, any plurality of scrims may be employed. Further, scrims may be utilized in conjunction with other types of displays.

The first display 18 may include one or more sensors 30, an imager 32, and/or actuators 34. The second display 20 may also include one or more sensors 36, an imager 38, and/or actuators 40. Further, the third display 22 may include one or more sensors 42, an imager 44, and/or actuators 46. It should be noted that in one embodiment, the first display 18, the second display 20, and/or the third display 22 may only include the sensors 30, 36, 42. The sensors 30, 36, 42 may be configured to detect a location (e.g., a position, a viewer location), presence, or movement of the guests 16 in the guest area 14, wherein the guests 16 represent one or more guests. The sensors 30, 36, 42 may also be configured to detect a gaze orientation (e.g., a viewer gaze orientation), which is associated with a direction or angle at which a head and/or eyes of the guest are oriented towards or focused on). The gaze orientation may be associated with a visual focus of the each of the guests 16. The sensors 30, 36, 42 may include any suitable optical, mechanical, electro-mechanical, electro-magnetic, auditory, pressure, and/or temperature sensors of any kind. For example, the sensors 30, 36, 42 may include a positional sensor (e.g., proximity sensor, radio-frequency identification (RFID) reader, optical sensor), an image sensor (e.g., a camera), or any other suitable type of sensor capable of detecting the location and/or the gaze orientation of the guests 16 in the guest area 14.

In one embodiment, the sensors 30, 36, 42 may be communicatively coupled to the graphics generation system 24 to provide sensor signals (e.g., sensor data) indicative of the position of the guests 16. The processor 26 may identify or determine the location of the guests 16 based on the sensor signals. The processor 26 may then generate instructions to instruct movement of the first display 18, the second display 20, and/or the third display 22 based on the sensor signals. In another embodiment, the processor 26 may generate instructions to adjust display of the images on the first display 18, the second display 20, and/or the third display 22 based on the location of the guests 16. For example, rather than adjusting the physical displays, images presented on the displays may be skewed to provide a desired visual result from the perspective of the guests 16. It should be appreciated that any variety of sensors, techniques, and so forth may be utilized to detect the position and/or a relative distance between each of the guests 16 and each of the first display 18, the second display 20, and/or the third display 22. Additionally, it should be noted that the processor 26 may generate the instructions based on a single guest 16 or on any number of guests 16. For example, present embodiments may essentially optimize based on data for just one guest or based on a combination of data from a group of guests (e.g., based on an average height and position of members of the group).

In one embodiment, the first display 18, the second display 20, and/or the third display 22 may include the imager 32, 38, 44 to provide images on a surface (e.g., a scrim). For example, the imager 32, 38, 44 may include a projector that separately projects images onto the first display 18, the second display 20, or the third display 22. The imager 32, 38, 44 may receive the graphics data from the graphics generation system 24 and project and adjust the images respectively for visualization by the guests 16 based on the graphics data.

In one embodiment, the first display 18, the second display 20, and/or the third display 22 may include the actuators 34, 40, 46. Each of the actuators 34, 40, 46 may be coupled respectively to the first display 18, the second display 20, and/or the third display 22 to enable movement. The actuators 34, 40, 46 may include any suitable type of actuator for providing motion, including, but not limited to, an electrical actuator, a pneumatic actuator, a mechanical actuator, a linear actuator, a rotary actuator, or any combination thereof. Based on instructions from the graphics generation system 24, the actuators 34, 40, 46 may each regulate movement of the first display 18, the second display 20, and the third display 22. As described herein, the graphics generation system 24 may receive the sensor signal indicative of the location of the guests 16 and may generate and provide instructions to the actuators 34, 40, 46 to move the first display 18, the second display 20, and/or the third display 22 based on the location of the guests 16.

Figure 2:
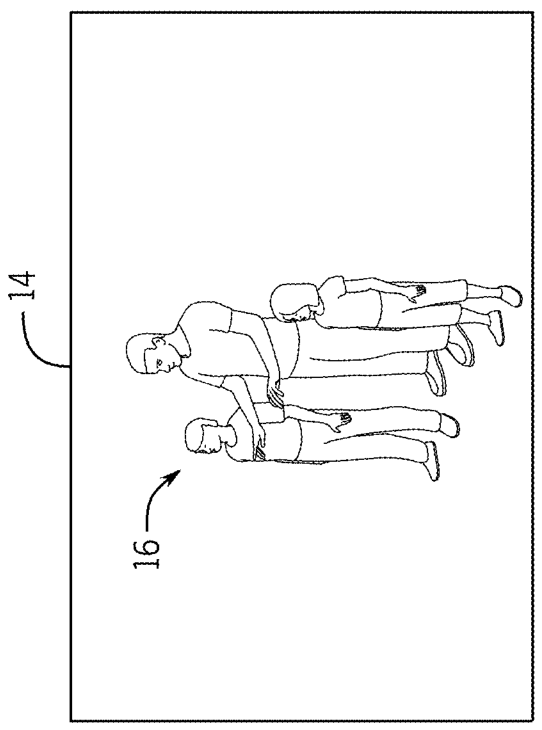
FIG. 2 schematically illustrates display of images by the visual effects system of FIG. 1, in accordance with an embodiment of the present disclosure.
Figure 2:
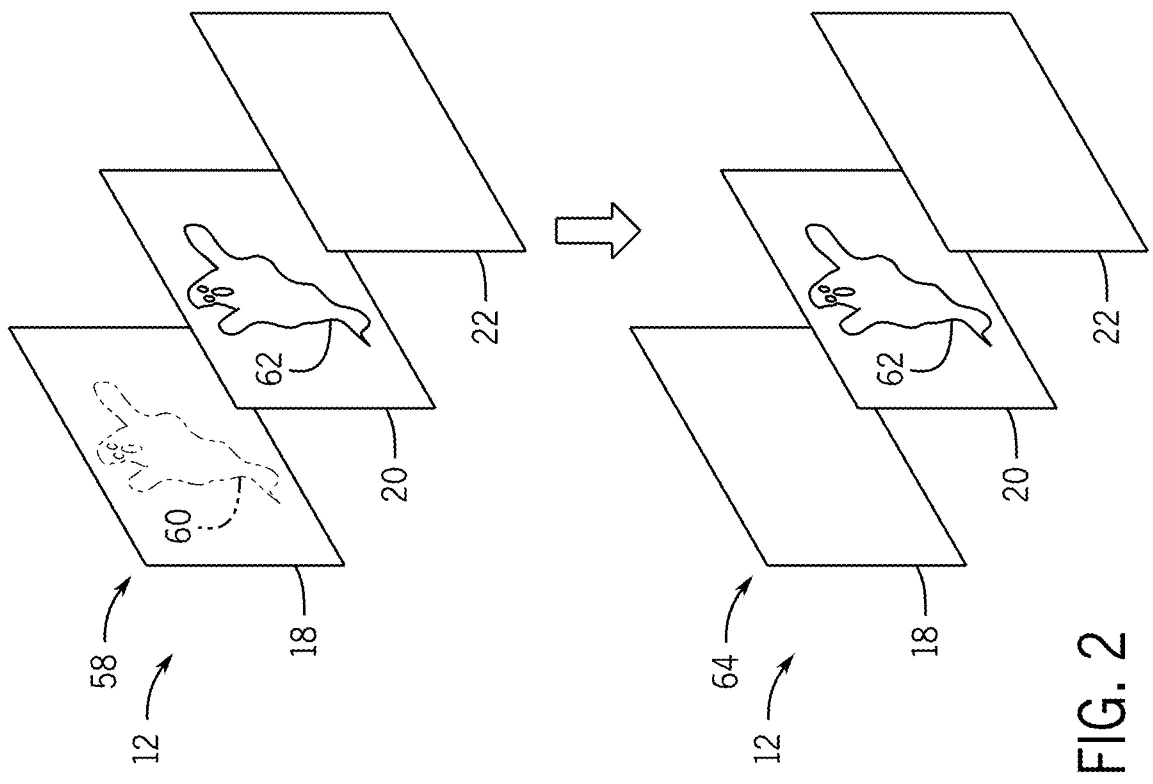

FIG. 2 schematically illustrates a display of images by the visual effects system 12 of FIG. 1, in accordance with an embodiment of the present disclosure. As described herein, the visual effects system 12 may include the first display 18, the second display 20, and/or the third display 22. The graphics generation system 24 may transmit graphics data to the first display 18 to cause display of a first image 60 on the first display 18. As an example, the first image 60 may include an image of a virtual object, such as a ghost. The first image 60 may initially be displayed on the first display 18 only at a first size and a maximum level of opacity (e.g., 100% opaque).

In operation, as illustrated, at a first configuration 58 (at a first time) the graphics generation system 24 may adjust display of the first image 60 on the first display 18 by adjusting (e.g., modifying) a first level of transparency of the first image 60. For example, the first image 60 may be a smaller size and the first level of transparency may be adjusted to seventy percent (e.g., 70%) transparency. Moreover, the graphics generation system 24 may instruct display of a second image 62 on the second display 20. The virtual object (e.g., the ghost) depicted in the second image 62 may be a second size (e.g., a larger size than the first size) and at a second level of transparency. As an example, the second level of transparency may be thirty percent (e.g., 30%) transparency. Thus, the virtual object within the first image 60 may appear to be moving towards the guests 16 by adjusting display of the first image 60 and causing display of the second image 62. Further, this combination of presentations and transparency adjustments on the first display 18 and the second display 20 create a perception in the guests 16 viewing the displays 18, 20 of the virtual object residing at a location between the displays 18, 20. That is, the partial imagery from each of the displays 18, 20 creates an illusion that the virtual object (e.g., the ghost) is physically present and consuming space between the displays 18, 20.

It should be noted that, in one embodiment, the display and adjustment of the first image 60 and/or the second image 62 may be performed by the graphics generation system 24 gradually (e.g., progressively, steadily, incrementally). For example, if the first image 60 is displayed with no transparency (e.g., 0% transparent) and the second image 62 is displayed at maximum transparency (e.g., 100% transparent), the level of transparency may be gradually reduced or increased. Indeed, as the first image 60 is adjusted to ten percent (e.g., 10%) transparency, the second image 62 may be adjusted to ninety percent (e.g., 90%) transparency. Further, as the first image 60 is adjusted to twenty percent (e.g., 20%) transparency, the second image 62 may be adjusted to eighty percent (e.g., 80%) transparency. The gradual adjustment may be employed by the visual effects system 12 to enable the visualization of a smooth transition of images from display to display. Along with these adjustments in transparency, the images themselves may change to correspond to movements of portions (e.g., layers) of the virtual object (e.g., the ghost). For example, in a scenario where the ghost is traveling toward the guests 16, the first portion of the illustrated ghost that would be 0% transparent on the second display 20 might be the face of the ghost because it would precede the trailing body of the ghost.

Additionally or alternatively, overlap of the first image 60 and the second image 62 between the first display 18 and the second display 20 may be adjusted by the graphics generation system 24 based on a desired transition speed. For example, the user may input a first transition speed for images between each of the displays. Thus, the first image 60 and the second image 62 may be adjusted on the first display 18 and/or the second display 20 within a first time period. The user may then update the input or add an additional input to adjust the desired transition speed to a second transition speed (e.g., faster than the first transition speed) for display of the images. Thus, the first image 60 and the second image 62 may be adjusted on the first display 18 and/or the second display 20 within a second time period (e.g., shorter or quicker than the first time period). In one embodiment, the transition speed may be automatically determined by the graphics generation system 24.

Referring back to FIG. 2, in a second configuration 64 (at a second time), the first image 60 may no longer be visible on the first display 18. For example, the first image 60 may be one-hundred percent (e.g., 100%) transparent or the first display 18 may have stopped (e.g., ceased) display of the first image 60 based on instructions from the graphics generation system 24. The second image 62 may be displayed at a third level of transparency, such as at zero percent (e.g., 0%) transparency. Indeed, the second image 62 may appear at maximum opacity. Thus, the second image 62 may only appear visible on the second display 20 to the guests 16.

It should be noted that although FIG. 2 is described with respect to display on the first display 18 and the second display 20, the third display may also be used to facilitate the visualization of the smooth transition by displaying the images. For example, the second image 62 may be displayed at a fourth level of transparency, while an additional image (e.g., a portion of the ghost) is displayed on the third display 22 at a desired level of transparency. In this manner, the virtual object may appear to be transitioning from one display to another, providing a more realistic illusion that the virtual object is moving toward or away from the guests 16. It should also be noted that the graphics generation system 24 adjusts imagery presented on each display based on a physics model of the virtual object and its location in the modeled space such that, for example, the trailing portion of the virtual object (e.g., a tail of the ghost) may be presented alone on a display (e.g., the first display) after a leading portion (e.g., a head of the ghost) has been determined to have reached the location associated with another display (e.g., the second or third display).

As described herein, in one embodiment, the sensors 30, 36, 42 may detect the location and/or the gaze orientation of the guests 16 within the guest area 14. For example, the location and/or the gaze orientation of the guests 16 may be defined by an x-coordinate (e.g., a horizontal position), a y-coordinate (e.g., a vertical position), and/or a z-coordinate (e.g., a depth position) within a three-dimensional space provided by the sensors 30, 36, 42. The graphics generation system 24 may determine a desired position of display for the first image 60 and the second image 62 based on the x-coordinate, the y-coordinate, and/or the z-coordinates of the guests 16.

Further, as described herein, the first display 18, the second display 20, and/or the third display 22 may be actuated (e.g., displaced, rotated) based on the location and/or the gaze orientation of the guests 16 to adjust display of the first image 60 and the second image 62. For example, if a first guest 16 is at a first height and a second guest 16 is at a second height, the graphics generation system 24 may determine to actuate each display to the desired position that is in between (e.g., in the center of) the first height and the second height to adjust for different sight lines and improve view of the images by the guests 16. Indeed, the graphics generation system 24 may determine an average of different sight lines based the user locations and/or the gaze orientations to improve visual accommodation of each of the guests 16.

As another example, if the guests 16 move towards a first direction, then the first display 18, the second display 20, and/or the third display 22 may also move in (e.g., actuate toward) the first direction. Additionally or alternatively, if the guests move towards a second direction, then the first display 18, the second display 20, and/or the third display 22 may also move towards the second direction. The first display 18, the second display 20, and/or the third display 22 may be actuated separately (e.g., individually) in any suitable direction. Alternatively, the first display 18, the second display 20, and/or the third display 22 may be actuated together in a uniform manner in any suitable direction.

The first image 60 and the second image 62 may also be adjusted based on the location and/or the gaze orientation of the guests 16. For example, the graphics generation system 24 may adjust the graphics data and provide the graphics data to enable adjustment of a depth, the level of transparency, a speed, and/or an orientation of the first image 60 and/or the second image 62 based on the location and/or the gaze orientation of the guests 16. For example, if the guests 16 are visually focused on the second display 20 instead of the first display 18, then the graphics generation system 24 may increase the speed of adjustment while increasing the level of transparency (e.g., making the first image 60 more transparent) of the first image 60 and decreasing the level of transparency (e.g., making the second image 62 less transparent) of the second image 62. It should be noted that the graphics generation system 24 may adjust display of the first image 60 and/or the second image dynamically (e.g., consistently, continuously) based on movement, changes in the gaze orientation, or a presence of fewer or more guests detected by the one or more sensors 30, 36, 42.

In one embodiment, the graphics generation system 24 may generate additional visual effects (e.g., side effects, visual disruptions) to distract the guests 16 while the adjustment is occurring. The graphics generation system 24 may determine a misalignment of the guests 16 from the first display 18, the second display 20, and/or the third display 22. For example, the graphics generation system 24 may determine the misalignment based on the sensor signals from the one or more sensors 30, 36, 42. The graphics generation system 24 may then generate the side effects based on the misalignment. The side effects may include pyrotechnics, flashing lights, fog, brightness adjustments, and so forth.

Therefore, if the guests 16 are not entirely aligned with (e.g., shifted to the right, shifted to the left, not in the center) or directly in front of the first display 18, the second display 20, and/or the third display 22 then the graphics generation system 24 may generate the additional visual effects to divert (e.g., detract) the attention of the guests. In this manner, the guests 16 may be unable to identify that an adjustment of the first image 60 and/or the second image 62 is occurring via the change in the graphics data or the actuation of the first display 18, the second display 20, and/or the third display 22.

Figure 3:
FIG. 3 is a schematic side view of a combined image as visualized by guests via the visual effects system of FIG. 1, in accordance with an embodiment of the present disclosure.
Figure 3:
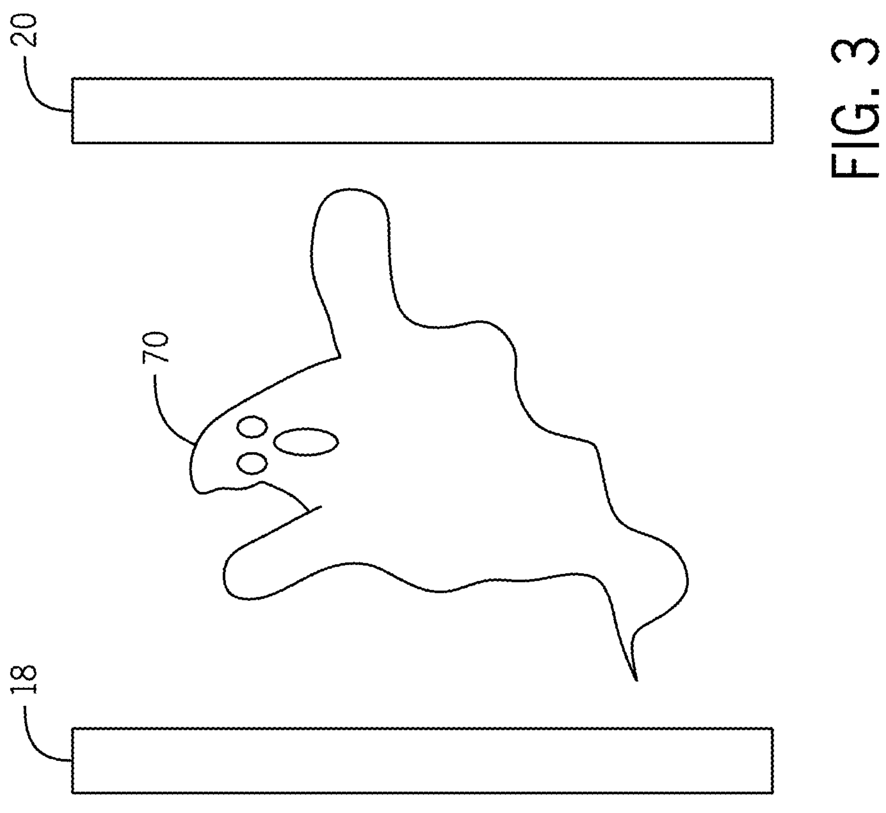

With the foregoing in mind, FIG. 3 is a schematic side view of a combined image 70 as visualized by the guests 16 via the visual effects system 12 of FIG. 1, in accordance with an embodiment of the present disclosure. The combined image 70 includes a combination of the first image 60 and the second image 62, which may be overlaid on each other due to the orientation of the first display 18, the second display 20, and/or the third display 22. That is, when the first image 60 and the second image 62 are presented to the guests 16, each appears as the combined image 70 (e.g., a single image) from a visual perspective of the guests 16. The combined image 70 is herein defined as imagery viewed together from different displays in an overlapping manner to create perception of a single virtual object in a three-dimensional space. As schematically represented in FIG. 3, this combined image 70 appears to the guests 16 (one or more viewers) as though it is at a location between the first display 18 and the second display 20. This illusion is achieved by creating a blended layering effect by presenting different and overlapping imagery with varying levels of transparency on the two displays 18, 20.

As the graphics generation system 24 adjusts each of the first image 60 and/or the second image 62, a depth or a distance of the virtual object displayed in the first image 60 and the second image 62 relative to the viewer may appear to change. As illustrated, based on the level of transparency of the first image 60 and the second image 62, the combined image 70 including the virtual object may visually appear to be at a distance in between the first display 18 and the second display.

For example, the first image 60 may be displayed at the level of transparency of fifty percent (e.g., 50%) and the second image 62 is displayed at the level of transparency of fifty percent (e.g., 50%). Thus, as illustrated in FIG. 3, the visual representation of the combined image 70 (e.g., the virtual object) may appear to the guests 16 to be in between the first display 18 and the second display 20. Indeed, the visual representation of the combined image 70 may appear to be at a point (e.g., a location) halfway (e.g., in the center) between the first display 18 and the second display 20. While at least a portion of the images displayed on the first display 18 and the second display 20 may be matching, some portions may be different to better achieve the desired effect. For example, based on the location of the virtual object as determined by the physics engine, a rear portion of the virtual object may be displayed on the first display 18 alone while a front portion of the virtual object may be displayed on the second display 20 alone, with a middle portion being displayed on each.

Thus, embodiments described herein may enable the visual representation of the combined image 70 to appear to be located at any point between the first display 18 and the second display 20. Further, by adjusting the graphics data, it should be noted that the visual representation of the combined image 70 may appear to be located at any point between the second display 20 and the third display 22. As an example, based on the second image 62 and a third image displayed on the third display 22, the visual representation of the combined image 70 may appear to be in between the second display 20 and the third display 22. In this manner, the visual effects system 12 may facilitate a seamless transition from display to display while providing the illusion of the virtual object moving toward or away from the guests 16. Further, to achieve such results for various different viewer positions (e.g., the guests 16 standing in different locations and having different heights), present embodiments may adjust the physical location of the displays 18, 20, 22 and/or adjust displayed imagery (e.g., adjust the skew of presented media) to accommodate a particular individual, a group average, a group median, or the like. Data for the guests 16 may be obtained with cameras, facial recognition applications, LIDAR, and the like (e.g., using the one or more sensors 30, 36, 42).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A visual effects system, comprising:
a first display in a physical space;
a second display in the physical space; and
a graphics generation system configured to provide graphics data to the first display and the second display to define a combined image, wherein the graphics generation system comprises:
a physics engine configured to determine a position and a shape of a virtual object with respect to the physical space and generate the graphics data based on the determined position and the shape of the virtual object with respect to the physical space; and
a processing system and a memory, the memory encoded with instructions configured to be executed by the processing system to cause the first display and the second display to:
display a first image comprising at least a first portion of the virtual object on the first display based on the graphics data and a user location, a user gaze orientation, or both;
display a second image comprising at least a second portion of the virtual object on the second display based on the graphics data and the user location, the user gaze orientation, or both; and
display a visual disruption on the first display, the second display, or both, while adjusting the first image, the second image, or both.

2. The visual effects system of claim 1, comprising one or more sensors configured to detect the user location, the user gaze orientation, or both and provide sensor data associated with the user location, the user gaze orientation, or both to the graphics generation system.

3. The visual effects system of claim 2, wherein the first display comprises a first one or more actuators and the second display comprises a second one or more actuators, and the instructions are configured to be executed by the processing system to cause the first one or more actuators and the second one or more actuators to move the first display, the second display, or both, based on the user location.

4. The visual effects system of claim 1, wherein the instructions are configured to be executed by the processing system to cause the first display to adjust the first image by modifying a first level of transparency.

5. The visual effects system of claim 4, wherein the instructions are configured to be executed by the processing system to cause the second display to adjust the second image by modifying a second level of transparency.

6. The visual effects system of claim 1, wherein the graphics generation system is configured to adjust the graphics data based on a user input associated with a three-dimensional model of a virtual environment.

7. The visual effects system of claim 1, wherein the graphics data comprises data associated with one or more shapes, transparency, one or more locations, one or more colors, lighting, or any combination thereof of the virtual object defined by the graphics generation system.

8. The visual effects system of claim 1, wherein the first display comprises a liquid crystal display (LCD), a light emitting diode (LED) display, an organic light emitting diode (OLED) display, a micro LED display, a transparent OLED display, or a transparent LCD display.

9. The visual effects system of claim 1, wherein the first display comprises a first scrim and the second display comprises a second scrim.

10. The visual effects system of claim 9, wherein the first display comprises a first projector configured to project the first image onto the first scrim, and wherein the second display comprises a second projector configured to project the second image onto the second scrim.

11. The visual effects system of claim 1, wherein the instructions are configured to be executed by the processing system to cause the first display to adjust display of the first image and the second display to adjust display of the second image based on a transition speed of the virtual object defined by the graphics generation system.

12. The visual effects system of claim 1, wherein the graphics data is configured to enable an adjustment of one or more depths, one or more levels of transparency, one or more orientations, one or more speeds, or any combination thereof of the first image, the second image, or both.

13. The visual effects system of claim 1, wherein the physics engine is configured to:

determine the position and the shape of the virtual object based on modeling a real-world environment corresponding to the physical space; and generate the graphics data to facilitate display of the virtual object in coordination with the real-world environment.

14. A method for operating a visual effects system, the method comprising:

determining, via a processing system, a position and a shape of a virtual object based on a model comprising the virtual object defined relative to a physical space;

displaying, via the processing system, a first image comprising at least a first portion of the virtual object on a first display in the physical space in coordination with the model based on graphics data;

adjusting, via the processing system, the first image on the first display based on a viewer location, a viewer gaze orientation, or both;

displaying, via the processing system, a second image comprising at least a second portion of the virtual object on a second display in the physical space in coordination with the model based on the graphics data;

adjusting, via the processing system, display of the second image on the second display based on the viewer location, the viewer gaze orientation, or both such that the first image and the second image coordinate to define a combined image representative of the virtual object; and displaying, via the processing system, a visual disruption on the first display, the second display, or both, while adjusting display of the first image, the second image, or both.

15. The method of claim 14, comprising instructing, via the processing system, actuation of one or more actuators respectively coupled to the first display and the second display to adjust the first image and the second image based on the viewer location, the viewer gaze orientation, or both to define the combined image to a user at the viewer location.

16. The method of claim 14, comprising adjusting, via the processing system, a level of transparency, a depth, a size, a speed of transition, or any combination thereof of the virtual object displayed via the combined image based on the viewer location, the viewer gaze orientation, or both.

17. The method of claim 14, comprising continuously adjusting, via the processing system, display of the first image, the second image, or both, based on a movement of the viewer location, a change in the viewer gaze orientation, changes to the virtual object, or any combination thereof.

18. A visual effects system, comprising:

a first display in a physical space;

a second display in the physical space; and a graphics generation system configured to provide graphics data to the first display and the second display, wherein the graphics generation system comprises:

a physics engine configured to determine a position and a shape of a virtual object with respect to the physical space and generate the graphics data based on the determined position and the determined shape of the virtual object with respect to the physical space; and a processing system and a memory, the memory encoded with instructions configured to be executed by the processing system to cause the first display and the second display to:

display a first image comprising at least a first portion of the virtual object on the first display based on the graphics data;

actuate to adjust the first image on the first display based on the graphics data and one or more viewer locations, one or more viewer gaze orientations, or both;

display a second image comprising at least a second portion of the virtual object on the second display based on the graphics data;

actuate to adjust the second image on the second display based on the graphics data and the one or more viewer locations, the one or more viewer gaze orientations, or both such that the first image and the second image define a combined image; and display a visual disruption on the first display, the second display, or both, while adjusting the first image, the second image, or both.

19. The visual effects system of claim 18, wherein the instructions are configured to be executed by the processing system to cause the first display to actuate and the second display to actuate based on an average of a sight line determined by the one or more viewer locations, the one or more viewer gaze orientations, or both.

* * * * *